(12) United States Patent
Greystoke

(10) Patent No.: US 9,767,498 B2
(45) Date of Patent: Sep. 19, 2017

(54) VIRTUAL PURCHASING ASSISTANT

(71) Applicant: LF TECHNOLOGY DEVELOPMENT CORPORATION LTD., London (GB)

(72) Inventor: Alexander Greystoke, Austin, TX (US)

(73) Assignee: LF Technology Development Corporation LTD., London (GB)

( * ) Notice: Subject to any disclaimer, the term of this patent is extended or adjusted under 35 U.S.C. 154(b) by 0 days.

(21) Appl. No.: 14/169,058

(22) Filed: Jan. 30, 2014

(65) Prior Publication Data

US 2014/0214615 A1    Jul. 31, 2014

Related U.S. Application Data

(60) Provisional application No. 61/759,314, filed on Jan. 31, 2013.

(51) Int. Cl.
*G06Q 30/06*    (2012.01)

(52) U.S. Cl.
CPC ..... *G06Q 30/0619* (2013.01); *G06Q 30/0631* (2013.01)

(58) Field of Classification Search
CPC .... G06Q 30/00; G06C 30/06; G06C 30/0281; G06C 30/0619; G06C 30/0631
USPC ............................ 705/26.1, 346, 26.44, 26.7
See application file for complete search history.

(56) References Cited

U.S. PATENT DOCUMENTS

| | | |
|---|---|---|
| 5,097,407 A | 3/1992 | Hino |
| 5,412,756 A | 5/1995 | Bauman |
| 5,537,618 A | 7/1996 | Boulton et al. |
| 5,566,291 A | 10/1996 | Boulton et al. |
| 5,680,305 A | 10/1997 | Apgar |

(Continued)

FOREIGN PATENT DOCUMENTS

RU    2254611    6/2005

OTHER PUBLICATIONS

Le, Building High-level Features Using Large Scale Unsupervised Learning, Proceedings of the 29 th International Conference on Machine Learning, 11 pages, 2012, Edinburgh, Scotland, UK.

(Continued)

*Primary Examiner* — Mila Airapetuan
(74) *Attorney, Agent, or Firm* — Cesari & Reed LLP; R. Michael Reed

(57) ABSTRACT

Methods and apparatus, including computer program products, are provided for an intelligent, continuously active purchasing assistant. The method may include receiving at least one customer specification from at least one potential customer of an expression of an interest in a purchase, the expression of the interest in the purchase comprising at least an interest lifetime; receiving a customer geolocation; receiving at least one supplier specification from at least one supplier of an inventory item; creating a continuous, real-time distribution channel comprising at least one match of the at least one customer specification and the at least one supplier specification of the inventory item, wherein the real-time distribution channel is sustained during the interest lifetime; and conducting an exchange wherein the inventory item is made available to the at least one potential customer. Related apparatus, systems, methods, and articles are also described.

20 Claims, 5 Drawing Sheets

(56) References Cited

U.S. PATENT DOCUMENTS

| | | | |
|---|---|---|---|
| 5,732,398 A | 3/1998 | Tagawa | |
| 5,948,040 A | 9/1999 | DeLorme et al. | |
| 6,023,687 A | 2/2000 | Weatherly et al. | |
| 6,049,784 A | 4/2000 | Weatherly et al. | |
| 6,088,686 A | 7/2000 | Walker et al. | |
| 6,119,101 A | 9/2000 | Peckover | |
| 6,169,981 B1 | 1/2001 | Werbos | |
| 6,512,525 B1 | 1/2003 | Capps | |
| 6,738,753 B1 | 5/2004 | Hogan | |
| 7,072,847 B2 | 7/2006 | Ulenas et al. | |
| 7,096,193 B1 | 8/2006 | Beaudoin et al. | |
| 7,107,239 B2 | 9/2006 | Graff | |
| 7,152,037 B2 | 12/2006 | Smith | |
| 7,162,494 B2 | 1/2007 | Arellano | |
| 7,203,662 B2 | 4/2007 | Das et al. | |
| 7,254,559 B2 | 8/2007 | Florance et al. | |
| 7,287,008 B1 | 10/2007 | Mahoney et al. | |
| 7,302,406 B2 | 11/2007 | Mallo et al. | |
| 7,319,976 B1 | 1/2008 | Peckover | |
| 7,376,613 B1 | 5/2008 | Cofino | |
| 7,386,620 B2 | 6/2008 | Lei et al. | |
| 7,464,109 B2 | 12/2008 | Modi | |
| 7,533,046 B2 | 5/2009 | Blanz et al. | |
| 7,580,855 B2 | 8/2009 | Fernandes | |
| 7,613,692 B2 | 11/2009 | Hamilton | |
| 7,739,408 B2 | 6/2010 | Fish et al. | |
| 7,769,705 B1 | 8/2010 | Luechtefeld | |
| 7,809,601 B2 | 10/2010 | Shaya et al. | |
| 7,865,404 B2 | 1/2011 | Peckover | |
| 7,904,366 B2 | 3/2011 | Pogust | |
| 7,921,068 B2 | 4/2011 | Guyon et al. | |
| 7,933,399 B2 | 4/2011 | Knott | |
| 7,962,578 B2 | 6/2011 | Makar | |
| 7,979,314 B2 | 7/2011 | Ulenas | |
| 7,984,005 B2 | 7/2011 | Bridges | |
| 8,145,536 B1 | 3/2012 | Goel | |
| 8,190,568 B2 | 5/2012 | Caballero-McCann | |
| 8,204,790 B1 | 6/2012 | Rogers | |
| 8,234,375 B2 | 7/2012 | Ghadialy et al. | |
| 8,257,173 B2 | 9/2012 | Bergelt | |
| 8,306,874 B2 | 11/2012 | Morgenstern et al. | |
| 8,326,890 B2 | 12/2012 | Desbarats | |
| 8,346,624 B2 | 1/2013 | Goad et al. | |
| 8,364,520 B1 | 1/2013 | Eichorn et al. | |
| 8,364,559 B1 | 1/2013 | Bhosle et al. | |
| 8,478,660 B2 | 7/2013 | Toro et al. | |
| 8,494,936 B2 | 7/2013 | Brenner | |
| 8,521,677 B2 | 8/2013 | Spring | |
| 8,560,396 B2 | 10/2013 | Peckover | |
| 8,589,529 B2 | 11/2013 | Siegel | |
| 8,606,636 B1* | 12/2013 | Keoshkerian | G06Q 30/0252 705/14.5 |
| 8,660,670 B2 | 2/2014 | Freed | |
| 8,666,844 B2 | 3/2014 | Shaya et al. | |
| 8,693,751 B2 | 4/2014 | Osborne | |
| 8,700,620 B1 | 4/2014 | Lieberman | |
| 2002/0046147 A1 | 4/2002 | Livesay | |
| 2002/0107764 A1 | 8/2002 | McCoy | |
| 2003/0004859 A1 | 1/2003 | Shaw et al. | |
| 2003/0093289 A1 | 5/2003 | Thornley et al. | |
| 2003/0144945 A1 | 7/2003 | Opsahl-Ong et al. | |
| 2003/0208362 A1 | 11/2003 | Enthoven et al. | |
| 2004/0039679 A1 | 2/2004 | Norton | |
| 2004/0107173 A1 | 6/2004 | Cheng | |
| 2004/0128230 A1 | 7/2004 | Oppenheimer et al. | |
| 2005/0055298 A1 | 3/2005 | Czora | |
| 2005/0177448 A1 | 8/2005 | Fu et al. | |
| 2005/0177488 A1 | 8/2005 | Rexrode | |
| 2005/0222861 A1 | 10/2005 | Silverman et al. | |
| 2006/0161482 A1 | 7/2006 | Jacobson et al. | |
| 2006/0184440 A1 | 8/2006 | Britti et al. | |
| 2006/0190279 A1 | 8/2006 | Heflin | |
| 2006/0212386 A1 | 9/2006 | Willey et al. | |
| 2006/0277077 A1 | 12/2006 | Coleman | |
| 2007/0016488 A1 | 1/2007 | Ulenas | |
| 2007/0043654 A1 | 2/2007 | Libman | |
| 2007/0106563 A1 | 5/2007 | Okada et al. | |
| 2007/0106656 A1* | 5/2007 | Gutta | G06F 17/30867 |
| 2007/0130059 A1 | 6/2007 | Lee et al. | |
| 2007/0162301 A1 | 7/2007 | Sussman | |
| 2007/0162332 A1 | 7/2007 | Helm | |
| 2008/0040141 A1 | 2/2008 | Torrenegra et al. | |
| 2008/0065429 A1 | 3/2008 | Galloway | |
| 2008/0120244 A1 | 5/2008 | Mello | |
| 2008/0243637 A1* | 10/2008 | Chan | G06Q 30/02 705/26.1 |
| 2008/0270163 A1 | 10/2008 | Green | |
| 2008/0320040 A1 | 12/2008 | Zhurakhinskaya | |
| 2009/0076926 A1 | 3/2009 | Zinberg | |
| 2009/0138342 A1 | 5/2009 | Otto | |
| 2009/0254360 A1 | 10/2009 | Chouby | |
| 2010/0010872 A1 | 1/2010 | Drummond | |
| 2010/0121808 A1 | 5/2010 | Kuhn | |
| 2011/0015954 A1 | 1/2011 | Ward | |
| 2011/0112869 A1 | 5/2011 | Greak | |
| 2011/0137776 A1 | 6/2011 | Goad et al. | |
| 2011/0212428 A1 | 9/2011 | Baker | |
| 2011/0289076 A1 | 11/2011 | Boyle et al. | |
| 2011/0307478 A1* | 12/2011 | Pinckney et al. | 707/724 |
| 2011/0320395 A1 | 12/2011 | Dada | |
| 2012/0010922 A1 | 1/2012 | Smith | |
| 2012/0084129 A1 | 4/2012 | Golden et al. | |
| 2012/0143712 A1 | 6/2012 | Echavarria | |
| 2012/0158500 A1 | 6/2012 | Hochstatter et al. | |
| 2012/0221393 A1 | 8/2012 | Ouimet et al. | |
| 2012/0239523 A1 | 9/2012 | Ouimet et al. | |
| 2012/0239524 A1 | 9/2012 | Ouimet et al. | |
| 2012/0253517 A1 | 10/2012 | Motupalli | |
| 2012/0253907 A1 | 10/2012 | Ouimet | |
| 2012/0265646 A1 | 10/2012 | Ghadialy et al. | |
| 2012/0284138 A1 | 11/2012 | Shave | |
| 2012/0330774 A1 | 12/2012 | Sadot et al. | |
| 2013/0066697 A1 | 3/2013 | Morganstern et al. | |
| 2013/0151368 A1 | 6/2013 | Goad et al. | |
| 2013/0151369 A1 | 6/2013 | Goad et al. | |
| 2013/0173335 A1 | 7/2013 | Evans et al. | |
| 2013/0173336 A1 | 7/2013 | Evans et al. | |
| 2013/0173418 A1 | 7/2013 | Goad et al. | |
| 2013/0231824 A1 | 9/2013 | Wilson | |
| 2013/0287270 A1 | 10/2013 | Harper | |
| 2013/0316834 A1 | 11/2013 | Vogel et al. | |
| 2013/0325652 A1 | 12/2013 | Ouimet | |
| 2014/0032467 A1 | 1/2014 | Reddy et al. | |
| 2014/0044364 A1 | 2/2014 | Abdulhayoglu et al. | |
| 2014/0046891 A1 | 2/2014 | Banas | |
| 2014/0074617 A1 | 3/2014 | Mukherji et al. | |
| 2014/0081684 A1 | 3/2014 | Hadar | |
| 2014/0108189 A1* | 4/2014 | Schumann | G06Q 30/0631 705/26.7 |
| 2014/0114705 A1 | 4/2014 | Bashvitz et al. | |
| 2014/0214486 A1 | 7/2014 | Greystoke | |
| 2015/0012467 A1 | 1/2015 | Greystoke | |

OTHER PUBLICATIONS

Dean, Using Large Scale Brain Simulations for Machine Learning and A.I., Google Blog, Jun. 26, 2012.
Mnih, Playing Atari with Deep Reinforcement Learning, Deep Mind Technologies, pp. 1-9, Dec. 19, 2013.
PCT/US2014/046059, International Search Report in related application, Apr. 2, 2015, 2 pages.
PCT/US2014/046059, Written Opinion in related application, Apr. 2, 2015, 6 pages.
International Search Report and Written Opinion, PCT/US2014/013948, May 15, 2014, 7 pages.
International Search Report and Written Opinion, PCT/US2014/013952, May 7, 2014, 7 pages.
Dyshlevoj, English Abstract, RU 2254611, Jun. 20, 2005, 2 pages.
Preliminary Report and Written Opinion, PCT/US2014/013948, Aug. 13, 2015, 4 pages.
Preliminary Report and Written Opinion, PCT/US2014/013952, Aug. 13, 2015, 5 pages.

(56) References Cited

OTHER PUBLICATIONS

Richard Magnone, The Art of Finding the Right Tenant, Jul. 19, 2009.

* cited by examiner

VIRTUAL PURCHASING ASSISTANT

CROSS REFERENCE TO RELATED APPLICATION

This application claims the benefit of priority under 35 U.S.C. §119(e) of U.S. provisional patent application No. 61/759,314, entitled "Virtual Purchasing Assistant," filed on Jan. 31, 2013. The contents of the above-identified application are incorporated herein by reference in their entirety.

FIELD OF INVENTION

The subject matter disclosed herein relates to data processing, and, in particular, to a purchasing assistant searching inventory to enable a match between interests of a potential customer and a supplier of the inventory.

BACKGROUND

Current systems of assisting in the purchase of an item typically take the form of a search performed by the potential customer that yields a snapshot of inventory offerings at that moment in time. Once that search snapshot is displayed, the potential customer is made aware of what is available at that moment in time. However, this search often yields few, if any results, that are useful for the every changing demands of a purchasing consumer, especially in the case of perishable goods/services, such as travel.

SUMMARY

In some example embodiments, there is provided a method. The method may include receiving, at one or more processors, at least one customer specification from at least one potential customer of an expression of an interest in a purchase, the expression of the interest in the purchase comprising at least an interest lifetime; receiving, at the one or more processors, a customer geolocation; receiving, at the one or more processors, at least one supplier specification from at least one supplier of an inventory item; creating, at the one or more processors, a real-time distribution channel comprising at least one match of the at least one customer specification and the at least one supplier specification of the inventory item, wherein the real-time distribution channel is sustained during the interest lifetime; conducting, at the one or more processors, an exchange wherein the inventory item is made available to the at least one potential customer; collecting, at the one or more processors, historical purchase information and activity data from the at least one potential customer; and analyzing, at the one or more processors, the historical purchase information and the activity data to form a customer purchase profile.

Articles are also described that comprise a tangibly embodied computer-readable medium embodying instructions that, when performed, cause one or more machines (for example, computers, etc.) to result in operations described herein. Similarly, apparatus are also described that can include a processor and a memory coupled to the processor. The memory can include one or more programs that cause the processor to perform one or more of the operations described herein.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DETAILED DESCRIPTION

Figure 1:
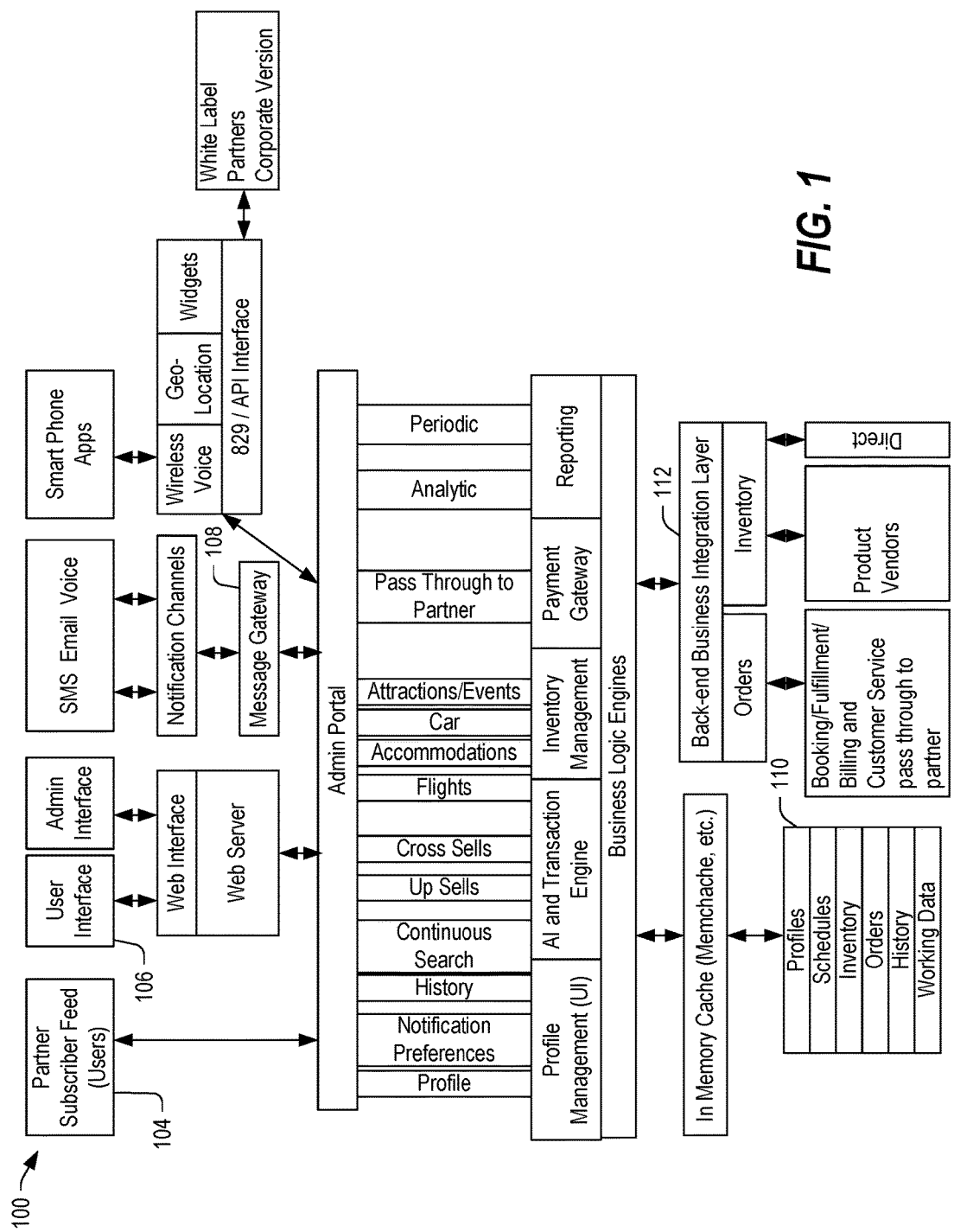
FIG. 1 depicts a system for providing dual push real-time exchange of time sensitive inventory, in accordance with some example embodiments.

Current systems of assisting in the purchase of an item typically take the form of a search performed by the potential customer that yields a snapshot of inventory offerings at that moment in time. Once that search snapshot is displayed, the potential customer is made aware of what is available at that moment in time, but the search is not ongoing and is not intelligent in that it does not keep track of an itinerary, current location, or secondary related purchases, and the search does not keep track of subsequent offers for similar items from suppliers.

The first category of goods or services that the virtual purchasing assistant disclosed herein relates to is an inventory that is distressed, time sensitive, or perishable. This is inventory that either has a finite shelf life or inventory that is overstocked. The glut can be caused by misreading of supply and demand, by some unforeseen event or the like. Regardless of the cause, the supplier is motivated to move the inventory to maximize profit or minimize his loss. Examples of inventory would be airline tickets, cruise line tickets, hotel rooms, villa rentals, restaurant seating, movie, and theatre tickets, and similar temporal events, as well as perishable inventory, such as groceries and pharmaceuticals.

The second category of goods or services that the virtual purchasing assistant disclosed herein relates to is upsells. An upsell could be an upgrade or ancillary offering from the supplier of the inventory offered for purchase. In the examples given above, an upsell for an airline could be an upgrade of a ticket to first class, an exit row, priority boarding or admission to a private lounge. In the case of a cruise line or hotel, example upsells would consist of spa treatments, meals at a hotel restaurant or providing larger or more luxurious accommodations.

The third category of goods or services that the virtual purchasing assistant disclosed herein relates to cross-sells. A cross-sell is an offer from a different supplier for goods and services related to or potentially relevant to the original inventory purchase. Examples of a cross-sell for an airline would be a car rental at the arrival destination, a hotel room, opera tickets, dinner accommodations and the like. Examples of cross-sells for cruise lines, hotels, villa rentals would also include items like flights, car hire, tours, entertainment venue tickets and the like.

The virtual purchasing assistant may create a private, personalized, and continuous communication bridge between an interested customer and a motivated supplier. The privacy of the communications is necessary to prevent price degradation of the core goods and services. The creation of this private communication bridge allows the formation of a real time distribution channel that offers visibility to an interested potential customer of inventory that is personalized, immediately actionable and not readily available to the public at large, although public inventory may be made available by the system discloser herein as well. In this way, interested and purchase ready customers are brought into immediate contact with motivated suppliers.

The virtual purchasing assistant may keep track of the user both from a location and time standpoint. These time and location tracking points are correlated to the user's activity and his surroundings. The virtual purchasing assistant may look for both at the needs and wants specified by the customer and constantly (or nearly constantly) looking at his immediate environment for items to purchase that he needs at that time and/or place whether those items are expressed as needs by the customer or anticipated as needs by the assistant. For instance, suppose a user is at the airport, but is running late for his flight, the virtual purchasing assistant would look at his ticket purchased, notating a boarding time, look at his location, moving slowly through check in, and suggest a purchase of priority screening or a purchase of a VIP escort by airline staff to the boarding gate. If the user is at the airport well in advance of his flight, the system might suggest a low cost lounge pass. The virtual purchasing assistant would also be constantly looking at the number of available upgrade seats on the aircraft and would adjust pricing on or negotiate pricing of these seats and/or of exit row seats on the user's behalf as departure becomes imminent, using a dynamic pricing algorithm. Again, the suggestion of an upgrade or exit row may be a result of a specific request or may be a recommendation by the assistant as an item the assistant believes the customer needs to improve his trip, for example because the customer is at the back of the plane or in a middle seat. The virtual purchasing assistant will continuously learn the user's purchasing and activity habits by time, location or circumstance and will also learn from customer successes and failures, choices, actions and inactions.

Dynamic pricing on inventory available from the system moves pricing up and down to reflect supply and demand events. For example if twenty empty exit row seats are available a week before departure and those same seats are available one hour before boarding, the system will, subject to supplier consent, adjust the pricing down to reflect imminent departure and may adjust pricing down at other earlier intervals. This pricing may occur by the virtual assistant acting on behalf of the supplier as it monitors purchasing activity against time to departure or may be the result of a suggestion by the virtual assistant on behalf of the customer to the supplier that he is ready to buy at a lower price given the time sensitivity.

The awareness of the virtual purchasing assistant of the users' location, time, activity and itinerary also allows it to look for related purchases for the user, based on his needs and/or prior purchasing history. If, for example, the user was traveling to London, the system could review the historical purchase data and based on this look for discounted opera tickets, or a table at the user's favorite restaurant. On an initial trip, the virtual assistant offers what the consumer would need to make the trip complete, better or more comfortable, either based on what the consumer requests at any point during the trip or based on what the virtual assistant believes a consumer would like; over time, the virtual assistant learns the consumer's tastes. An example is a message sent to the User on arrival to Heathrow Airport stating: "Welcome to London, I notice you haven't booked a place to stay or a car, would you like to book the Marriott Park Lane at 50% off or a car from Hertz for £25 a day? If you have some spare time, you may want to take a trip on the world famous London Eye, I have tickets available at 30% off." The intelligence of the system allows a consumer to rely on it, as he would an assistant, such as a travel companion, a travel agent, and the like, tasked with looking after and planning his or her trip and travel related details, including items the user would have forgotten or not thought about at all. The best assistant is always ten steps ahead of his boss, knowing every little detail of his boss' interests, likes, and dislikes and even eccentricities. The assistant caters to his boss' every need, no matter how unreasonable, provides value to his boss by saving him money, caters to his boss changing his mind even at short notice, realizes how short of time his boss is and that he may forget items. The virtual assistant described herein has all these features. The system may continuously (e.g., in an ongoing manner) search for items in the best interest of the user, on a continuous basis, whether the consumer is awake or asleep, either to find an item needed, an item that while not needed may improve the user's experience, or a cheaper or better alternative until told to stop. As used herein, continuously refers to repeatedly searching in a continuous or near continuous manner. The system disclosed herein may include a continuous review of needed or wanted items intelligently pushed out to the user as they become available or as an improved or alternative item becomes available in real time.

The virtual purchasing assistant disclosed herein may also continuously search for items that are similar to items that cannot be located for purchase if allowed to by the user. This three-dimensional, time, location and want overlap that the system brings to bear is not seen in other systems. The system constraints are set by the user as options, including the degree to which he is open to the assistant's ideas, suggestions or product offerings. These constraints can be adjusted at any time and any adjustment takes effect immediately in real time. If an exact want is not available, the system will continue looking and offer similar items in the interim, based initially on what the assistant considers similar and subsequently on what the user considers similar, as the assistant learns customer preferences.

The virtual purchasing assistant may include two interaction gateways, which are referred to as portals, a user portal and a supplier portal. Each supplier may have their own supplier portal. The two portals can communicate with one another by way of the private communication bridge. Both portals are intelligent and the private communication bridge that connects them is intelligent, although some suppliers may not have a supplier portal and instead rely on aspects of system 100 depicted at FIG. 1 to handle inventory.

The user portal of the virtual purchasing assistant will collect a user specification in which a set of expressed interests for purchase and a series of options are chosen. This expression of interest and options will form the basis of an ongoing, continuous search through available inventory on the supplier portals to locate matches. However, this ongoing search is only a part of the user portal input. In addition, a historical database of items including but not limited to detailed user features and profile, activity, prior expressions of interest, options, previous purchases and previous offer declines is kept. At least the location and time of each of these historical database items is logged and analyzed. The current itinerary and detailed activity of the user is kept to form an ever changing matrix for decision making that a user suggestion engine will use in its analysis of the historical database. This user portal will also utilize the historical database to act as an offer filter, so that in addition to any items he specifically requests, the user is only provided with the most relevant, proximity based, timely offers that he is most likely to want, and/or the offers that are sent may be prioritized. The user will not be inundated with every offer within his immediate environment, only those he has expressed interest in currently, or has purchased in the past, or, if specified by the customer, which the assistant believes he will want based on actual, recent, relevant activity. The user portal provides a vast trove of constantly updated data and immediate, filtered feedback of offers it is searching on an ongoing basis that is customized to the user.

The supplier portal of the virtual purchasing assistant will collect a supplier specification which may include inventory, price, timing and location of inventory, inventory categories, classes or restrictions and segmentation parameters, meaning fields users must satisfy in order to see that specific type of inventory, such as living in a specific zip code or being of a specified frequent flier status. On the supplier portal side, historical information is collected with respect to each customer, what they want to purchase, where and at what price they are most likely to make a purchase or refuse an offer. The supplier portal is filtered, so that it is provided with only the information most needed to close a deal, confidentially and quickly. Upsell offers, cross sell offers, and/or any other offers may be made to the user from the supplier portal based on specific user requests or at least on the tracked location of the user, the time, the previous sales history, and activity of the user and recommendations by the assistant. Dynamic pricing driven by supply and demand is suggested to the supplier portal, and if agreed to, incorporated in upsell items pushed to the user as an offer.

The private communication bridge of the virtual purchasing assistant provides a bridge not only to the supplier of the original inventory purchase, but to other suppliers of related goods and services either generally or in the proximity of the user, based on his itinerary, activity and previous purchase history. Privacy of both the user's data and the supplier's data and consents is essential during communications for the real time exchange in order to protect the interests of both parties.

The private communication bridge user portal may work on any device with a processor, such as a tablet PC, desktop PC, cell phone, laptop and the like, whether GPS enabled or receiving locator signals based on nearest communications link.

The private communication bridge may also interface with supplier system interfaces, third party inventory management systems and the like, although the supplier may rely on system 100 to send offers and/or inventory without the use of the supplier system interface as well.

The virtual purchasing assistant though it has been described as working with one user, can function for a group and keep the group together in flights, shuttles, hotels, or as each of the group specifies.

Inventory issues responded to may include, but are not limited to fixed inventory that is not selling close to the point it perishes, inventory that becomes un-saleable at a point in time, such as an upgrade once boarding has started, or misread demand, for example televisions ordered to meet an anticipated Christmas rush that don't sell well, changing customer behavior such as a last minute cancellation, unexpected negative customer reaction such as some tablet computers, obsolescence, or unexpected geopolitical or economic events such as the Japanese nuclear disaster, and/or any other type of inventory.

Upsell/cross-sell inventory issues responded to may include the suppliers' inability to create dynamic pricing, inability to make discreet, targeted, or intelligent offers to potential customers very late in the day such as immediately prior to departure, post arrival at a hotel or post arrival at a destination. Also responded to is the inability to offer timely, location specific, targeted upsells either generally or incorporating dynamic pricing. Dynamic pricing takes into account actual supply and demand and the future worth of that good or service. Some upsells have a future worth of zero, such as an unsold first class upgrade, or exit row seat once the boarding has concluded. The ability to offer timely, location specific, targeted upsells both generally and with dynamic pricing, is needed as these upsell sales result in significant additional revenue for suppliers. Upsells/cross-sells will be offered to the user based on his request, and those that the system recommends if that option is chosen, and the upsells/cross-sells may be offered continuously to a user, in real time, and intelligently. Real time as used herein refers to the offers, recommendations, and the like being sent substantially immediately and/or when available. And, intelligent as used herein refers to the offers/recommendations being based on pattern recognition and/or intelligent processing techniques that weight various factors in connection with the offers/recommendations.

A secondary issue also may arise when a potential customer who is offered a limited quantity, time sensitive, fixed price product or a heavily discounted product for bid is subsequently beaten to the purchase or outbid. In current systems, this potential customer and those in a similar position are left unsatisfied and their potential transactions are left unfilled. A way to be able to offer these non-winning users a follow-on second chance at the same product or some closely aligned product they would be interested in is needed and is offered by the assistant that pushes data back on their unsuccessful attempts, including pricing sensitivities, to the supplier.

Some of the issues that immediately present themselves are, discrepancies between forecast supply and actual demand, sudden changes in potential customer behavior, unforeseen events, difficulties in efficiently and discreetly communicating with potential customers about available items late in the day, knowing what a consumer wants to buy in real time and at different time periods and what their pricing, time and other sensitivities are, inability to communicate and efficiently form a distribution channel for targeted upsells, cross sells, and the like, whether priced conventionally or dynamically very late in the day and an inability to meet the needs of potential customers who may form a viable second tier market.

The subject matter disclosed herein may solve one or more of the described problems. The described method, system and computer readable medium allows suppliers to move distressed, time sensitive or perishable inventory at a point in time when the possibility of a sale is reduced. The inventory may be offered in real-time, confidentially and on a highly targeted and intelligent basis whereby potential customers are shown exactly what product they are looking for, when they are looking for it and meeting whatever precise preferences they specify in the user portal. The supplier may fully control what inventory is made available, at what price and may segment users to whom the product is offered the item and when. The user no longer has to search for the product he wants, is offered continuous results, and now has access to non-public and any other inventory at discounted prices and personalized to his exact specifications. The supplier may discreetly push out inventory that has a reduced possibility of sale to users looking for that exact product at that time at that place.

Therefore, what is needed is a virtual purchasing assistant. More specifically, what is needed is the creation of an ongoing, continuously updated confidential real-time distribution channel between the user and the supplier in which both have real-time exchange information pushed to them to facilitate a matching of time sensitive inventory from a motivated seller to an interested buyer.

The subject matter disclosed herein is based on the insight that the price of an item that may be commanded from certain classes of assets will go to zero at a point in time. Assets that fit these criteria would include airline tickets upon their time of departure. The subject matter disclosed herein uses without limitation email, texting, application, and voice technologies to notify potential customers of real time non-public and/or public offers on items they have specifically requested or that are recommended to them by the assistant at a reduced price, if they want to purchase that inventory immediately. The system also continuously pushes data from the user to the supplier and from the supplier to the user to facilitate repeated upsell or cross-sell offers. In this way the system is dual push, pushing a product offer of a match of an expressed interest to a potential customer and pushing user data and requests back to the supplier for possible additional sales.

The subject matter disclosed herein provides a private communication bridge between each individual potential customer and each individual supplier. This bridge allows the supplier to personalize and improve the user's purchase for both those products in which the customer has expressed an interest and those that historical data or the intelligence of the assistant show would probably interest the customer.

FIG. 1 shows an example system overview 100. A private communications bridge 102 that comprises one or more processors is communicably coupled to a supplier portal 104, a user portal 106, a messaging gateway 108 that is communicably coupled with a mobile device 114, the World Wide Web 108 or the like. On the back end the private communications bridge 102 is coupled to a data server 110 and a backend business integration portal 112.

The real-time exchange portal may include four components, an enterprise database, a set of business logic engines, a reporting engine and a suggestion engine. The present system maintains a customer support function and self-serve website interface for subscribers, manages real-time exchanges of available inventory, and selects which subscriber obtains specific items at what price, manages subscriber interactions and originates the orders to be placed upon real-time exchange completion.

The enterprise database maintains subscriber account information, including contact information, travel preferences, frequent travel program information and payment details, trips and electronic ticket information, product purchasing history, available seat inventory to be used within real-time exchanges, and limitations on that inventory, such as a floor price, electronic commerce information, such as orders that have or will be placed with fulfillment partners, invoices for corporate clients and receipts from invoices, records of customer support calls and transient working data, such as that which would be necessary to support an active real-time exchange while still in process. The real-time exchange will finalize in a collection of orders, and subsequently, a collection of trips/electronic tickets and/or purchases.

The business logic engines decompose all of the application modules into building blocks that may be extended, but also may handle the same type of function in different ways for different markets, the logic engines are composed of profile management engines and transaction engines.

The profile management engine manages the subscribers contact information, trip schedule and travel or product preference information, creates views and allows updates and notices for bids or purchases in active real-time exchanges, and maintains a queue of active electronic tickets and purchases and a history of previous trips and purchasing activity.

The transaction engine may handle at least two types of real-time exchanges, the first being first n-bidders above a particular price threshold and the second being top n-bidders out of a set of m-bidders who submitted before a deadline. There will be other attractive real-time exchange types that may emerge in the future, and the subject matter disclosed herein will support other real-time exchange types as well including fixed price sales The inventory management engines are envisioned to interactively or in bulk-fashion upload or search inventory (seats, rooms or other products), availability (schedules, open dates), deadlines by which the inventory must be placed before it reverts, limits (price floors, restrictions) and segmentation parameters, such as specifications required from a user to see the inventory, for example being in a certain zip code or of a certain frequent flier status. This is the base data that is matched against consumer preferences when creating a participant list for a real-time exchange. This is then updated continuously based on real-time exchange results.

The reporting engine will include records of all transactions, both to the suppliers and to its partners, as appropriate. An aggregate set of behavioral data will allow the suggestion engine to make more and more intelligent offers regarding the types of trips, inventory, products and upsells or cross-sells that someone may consider, whether these items are or are not mentioned directly in the customer and supplier specifications. The company believes that an advanced suggestion engine will be part of the analytic function, and will tie into the geolocation and time integration, creating even more value in the future. This engine also, incidentally, handles customer service related reporting and issue tracking.

The suggestion engine of the subject matter disclosed herein is intelligent. It learns from the choices, decisions and actions of the potential customer. This may range from advising the potential customer on other destinations similar to those he has chosen that he may wish to see offers on, monitoring his travel experience and offering things that may make it better or more efficient such as offering an extra legroom seat or exit row where the potential customer is stuck in a middle seat/offering priority security access when the potential customer is running late, to offering advice, such as suggesting an increase in bid to $X if a better chance of winning or try travelling on a Tuesday instead when historically there is more availability or better prices. It also learns from supplier behavior and decisions, so for example if a supplier provides ten seats at $100 and they sell in 5 minutes, suggesting that the supplier either increase the price or provide staggered pricing. Similarly if products don't sell, the system may advise to either lower the price, add fields of people to show the offer to, or to sell at a different time of day (for example there may be very low take-up in the evening but high take-up during the morning).

Additionally the present embodiment may include a web interface for interaction with the subscriber and a messaging gateway for sending instantaneous SMS, email, app or voice notifications, and allowing for bidding, purchasing and all elements of a transaction from a mobile phone using any of these notification mechanisms or others.

Figure 2:
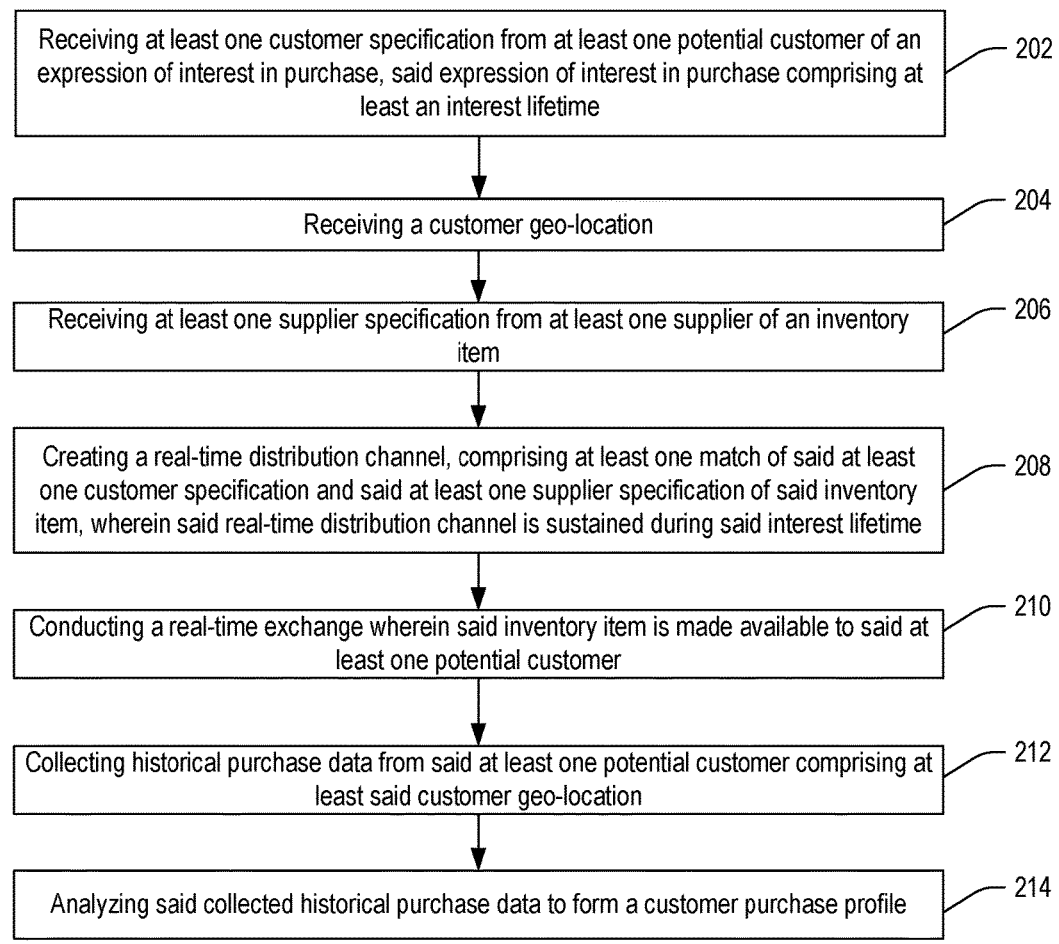
FIG. 2 depicts a second method of providing dual push real-time exchange of time sensitive inventory, in accordance with some example embodiments.

FIG. 2 shows an example method diagram 200. A method of providing a virtual purchasing assistant comprises the steps of, receiving 202 a customer specification from a potential customer of an expression of interest in purchase, the expression of interest in purchase includes an interest lifetime. The interest lifetime is chosen by the user and can either be time based, a period of three weeks, a particular date, or always, for example, or event based, such as stopping the search for airfares the day the plane is due to depart. The method includes receiving 204 a customer geolocation, receiving 206 a supplier specification from a supplier of an inventory item, creating 208 a real-time distribution channel that comprises a match of the customer specification and the supplier specification of the inventory item, where the real-time distribution channel is sustained during the interest lifetime. The method further includes conducting 210 a real-time exchange where the inventory item is made available to the potential customer, collecting 212 historical purchase and activity data from the potential customer, collecting customer geolocation and timeframe of purchase and analyzing 214 the collected historical purchase and activity data to form a customer purchase profile. In this manner, it can be determined if a particular customer plans or is spontaneous for particular activities, or enjoys particular activities in specific locations (such as going to the theatre in London, but not in New York).

The method may further include analyzing the collected historical purchase and activity data and correlating a purchase type or a decline type to the customer geolocation and include notifying the potential customer of an offer acceptance in the form of an electronic mail message, a simple message service text message, an app message or a voice notification. The collected historical purchase and activity data may include a time of purchase and the customer purchase and activity data may be sent to the supplier with the potential customer's permission. The customer specification may include an itinerary, the supplier specification may include an inventory item location where the real-time distribution channel may include only inventory items located proximate to the potential customer taking into account his geolocation.

Figure 3:
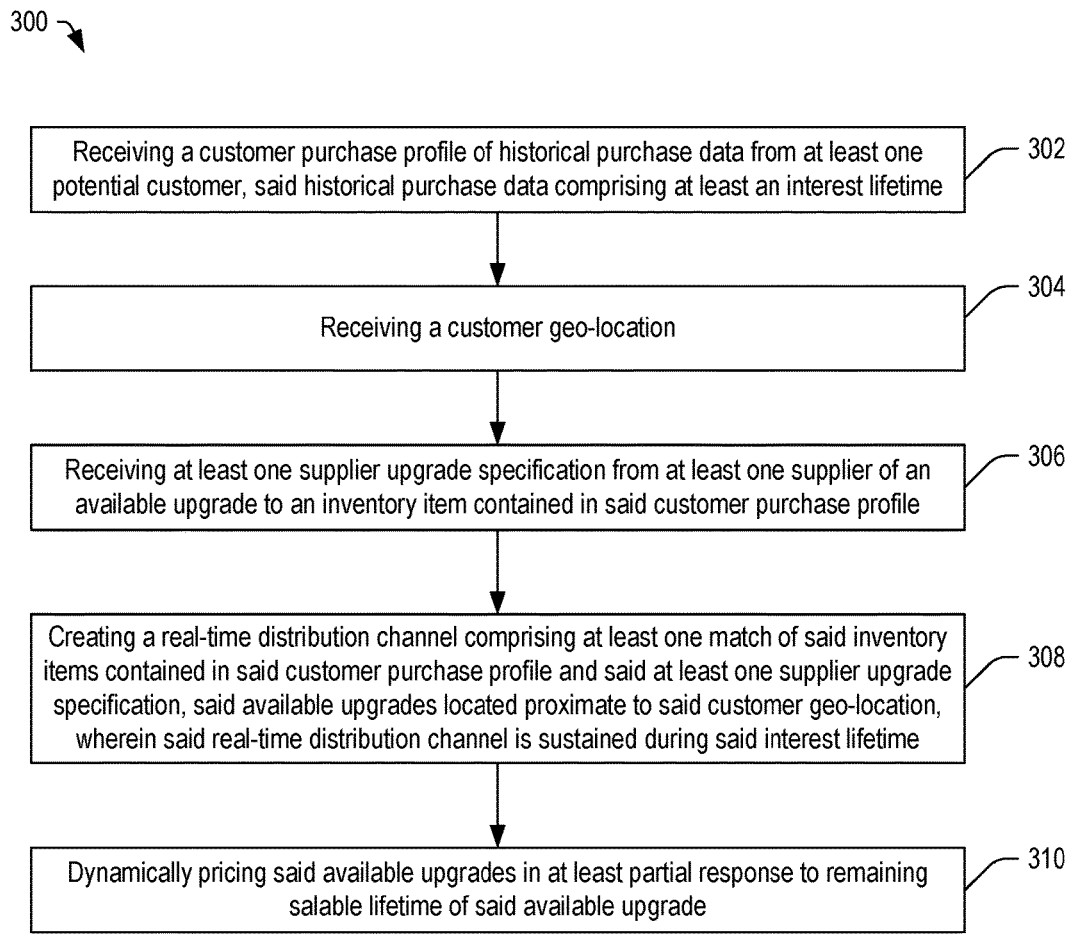
FIG. 3 depicts a third method of providing dual push real-time exchange of time sensitive inventory, in accordance with some example embodiments.

FIG. 3 shows an example method diagram 300. A method of providing a virtual purchasing assistant comprises the steps of receiving 302 a customer purchase profile of historical purchase or activity data from a potential customer, which includes an interest lifetime. The method further includes receiving 304 a customer geolocation, receiving 306 a supplier upsell specification from a supplier of an available upsell to an inventory item contained in the customer purchase profile. The method includes creating 308 a real-time distribution channel that comprises a match of the inventory items contained in the customer purchase profile and the supplier upsell specification, available upsells located proximate to the customer geolocation, where the real-time distribution channel is sustained during the interest lifetime or more generally and dynamically pricing 310 available upsells in partial response to remaining salable lifetime of the available upsell.

The method may further include receiving a customer specification that comprises an upsell/cross-sell preference, receiving a time period and analyzing the itinerary associated with the customer purchase profile and historical purchase and activity data to infer possible additional upsell/cross-sell purchases the customer would be interested in. The customer specification may include or be connected to an itinerary of the potential customer. The method may also include receiving a time period of the customer and geolocation and suggesting an available upsell/cross-sell based upon any or all of the time period, the customer geolocation and the itinerary.

An example of an airline upsell is the selling of an upgraded seat to an exit row or business class seat or priority boarding. The virtual purchasing assistant can track where the user is and at what time with respect to the itinerary framework based upon geolocation and other programming. If, for example, there is little time to get to the gate, the virtual purchasing assistant can suggest purchasing priority security access or a VIP escort to the gate. This is only one example of suggestions the virtual purchasing assistant can make. The method can also suggest upgrades to seating on the aircraft subject to availability and price. Where a supplier allows, the sales price would be dynamic and fluctuates with supply and demand.

An example of a cruise line upsell would be the suggestion to upgrade a cabin, based on availability and price. Hotels could offer a spa treatment prior to check in or after check in based on the real time availability of open slots, for example offering a customer in his room the ability to get 20% off his spa treatment if he can take advantage of an empty slot in the next hour.

Figure 4:
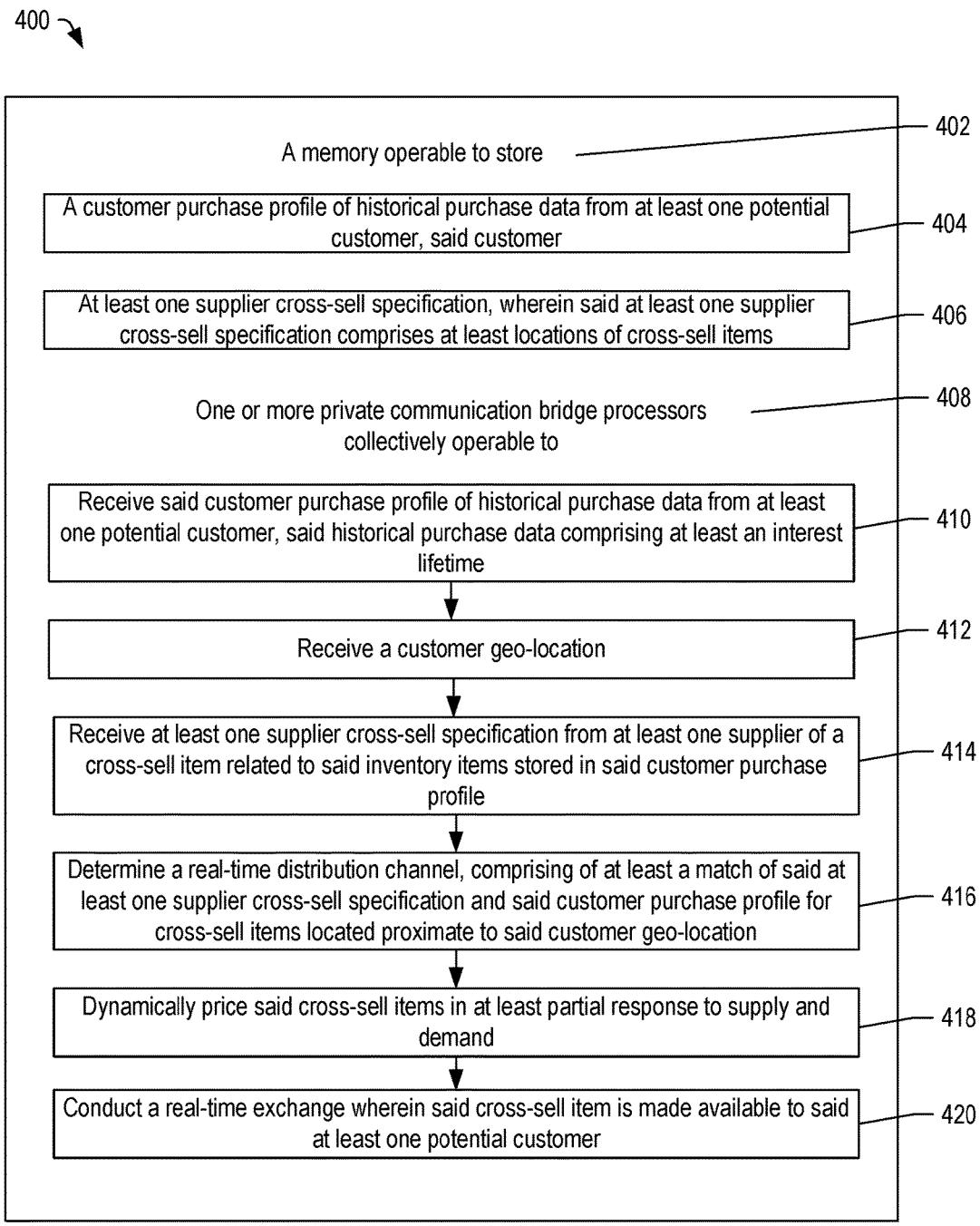
FIG. 4 depicts a system of providing dual push real-time exchange of time sensitive inventory, in accordance with some example embodiments.

FIG. 4 shows an example system diagram 400. A system for providing a virtual purchasing assistant comprises a memory 402 that stores a customer purchase profile 404 including historical purchase and activity data from a potential customer, the customer purchase profile that comprises an inventory item, and a supplier cross-sell specification 406, where the supplier cross-sell specification comprises locations of cross-sell items. The system further includes one or more private communication bridge processors 408 coupled to the memory which receive 410 the customer purchase profile and historical purchase and activity data from the potential customer including an interest lifetime, receive 412 a customer geolocation and receive 414 a supplier cross-sell specification from a supplier of a cross-sell item related to the inventory items stored in the customer purchase profile. The private communication bridge processors determine 416 a real time distribution channel that matches the supplier cross-sell specification and the customer purchase profile for cross-sell items located proximate to the customer geolocation, dynamically price 418 the cross-sell items in at least partial response to supply and demand (where allowed by the supplier) and conducts 420 a real-time exchange where the cross-sell or upsell item is made available to the potential customer.

The private communication bridge processors may further include instructions for receiving a customer specification that comprises an upsell/cross-sell preference and analyzing the customer purchase profile of historical purchase and activity data to infer possible additional upsell/cross-sell purchases. The customer purchase profile of historical purchase and activity data may include or be connected to an itinerary of the potential customer. The private communication bridge processors may further include instructions for receiving a time period of the customer and his geolocation and suggesting a cross-sell based on any of the time period, the customer geolocation and the itinerary.

An example of an airline cross-sell is the selling of a hotel room or a car. The system allows these sales at any point in time before travel or at the destination. In the case of cruise lines, a cross-sell would be the booking of a flight or a tour at a port of call. In the case of a hotel or villa a cross-sell would be booking flights, car hire, entertainment, a limo or a meal.

Figure 5:
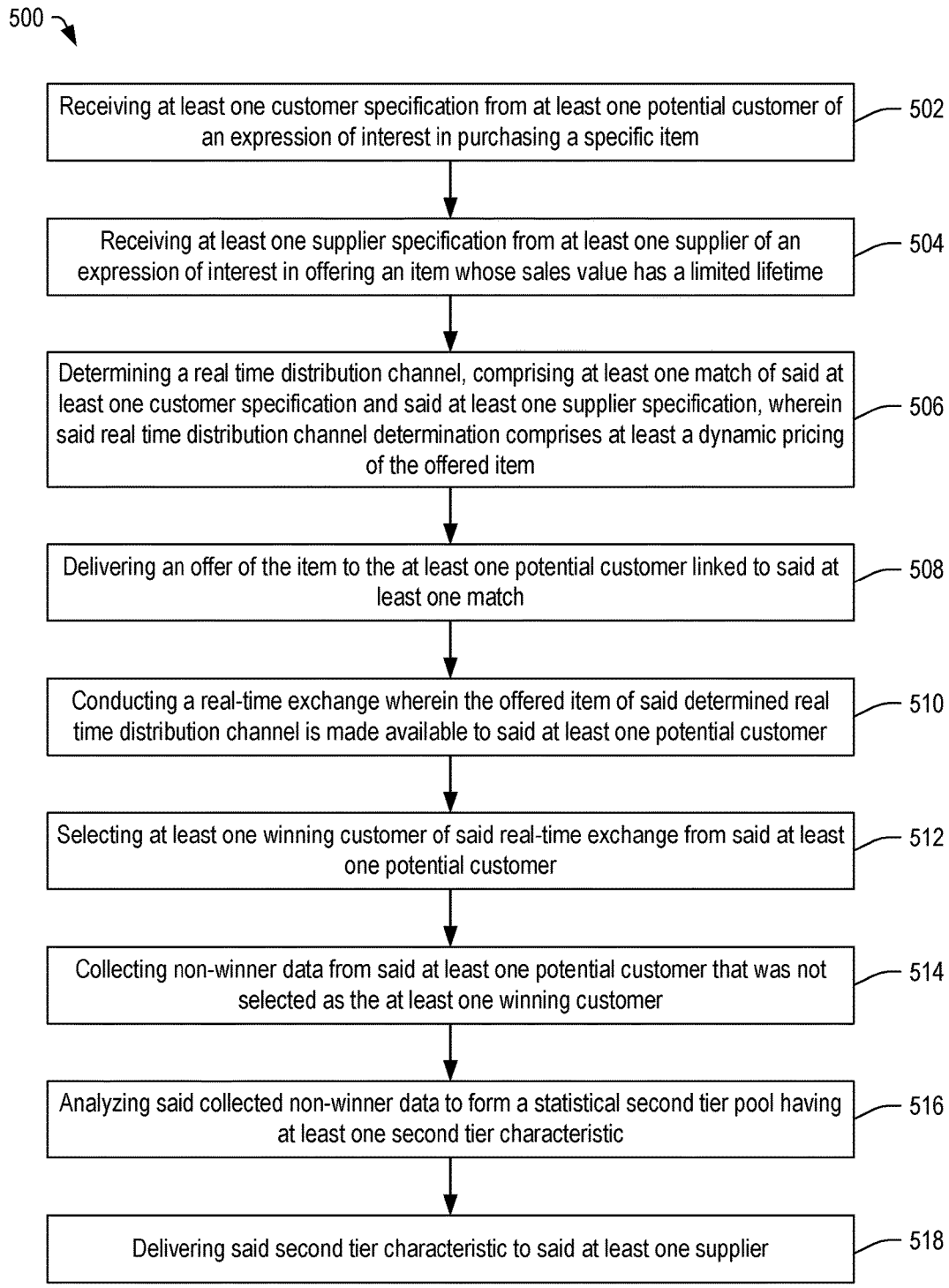
FIG. 5 depicts a computer readable medium of providing dual push real-time exchange of time sensitive inventory, in accordance with some example embodiments.

FIG. 5 shows an example computer readable medium diagram 500. A computer readable medium comprises computer instructions for controlling one or more real-time exchange portal processors that provide a dual push real-time exchange of time sensitive inventory executing the steps of receiving 502 a customer specification from a potential customer of an expression of interest in purchase and receiving 504 a supplier specification from a supplier of offering an inventory item whose sales value has a limited lifetime. The steps further include determining 506 a real time distribution channel that matches the customer specification to the supplier specification. The steps include delivering 508 an offer of the inventory item to potential customers linked to the match, conducting 510 a real-time exchange where the inventory item of the determined real time distribution channel is made available to the potential customers and selecting 512 a winning customer/s of the real-time exchange from all the potential customers. Additional steps include collecting 514 non-winner data from the potential customers that were not selected as the winning customer, analyzing 516 the collected non-winner data to form a statistical second tier pool having a second tier characteristic, and delivering 518 the second tier characteristic to the supplier.

The execution of steps may further include analyzing the customer specification against the collected non-winner data, suggesting a second tier real-time exchange based upon the non-winner data analysis, collecting historical bid/purchase data of the potential customer, analyzing the customer specification against the collected historical bid/purchase data, and suggesting an upsell or cross-sell based on the analysis. The execution of steps may also include delivering a winning notification message to the winning customer, and delivering a non-winner notification message to the potential customer that was not selected as the winning customer.

Although an exemplary embodiment of the method, system and computer readable media have been illustrated in the accompanied drawings and described in the foregoing detailed description, it will be understood that the description is not limited to the embodiments disclosed, but is capable of numerous rearrangements, modifications, and substitutions without departing from the spirit of the description as set forth and defined by the following claims. For example, the capabilities may be performed fully and/or partially by a processor whether in a server or mobile. Also, these capabilities may be performed in the current manner or in a distributed manner and on, or via, any device able to provide and/or receive items and/or potential customer information. Further, although depicted in a particular manner, various modules or blocks may be repositioned without departing from the scope of the description.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
providing a virtual purchasing assistant that includes a memory to store a digital representation of a customer purchase profile including historical purchase information and activity data of a potential customer;
receiving, at a user portal, first data corresponding to the customer purchase profile;
receiving, at a supplier portal, second data corresponding to a supplier specification of a potential inventory item;
establishing, via the virtual purchasing assistant and a private communication bridge processor, a private communication bridge between the potential customer and a supplier;
receiving a query, at the private communication bridge processor via the user portal, based on an expression of an interest in a purchase of an inventory item by the potential customer, the expression including at least an interest lifetime which indicates a period in which the potential customer may acquire the inventory item;
matching, at the private communication bridge processor, at least one match of the inventory item to the supplier specification of the potential inventory item;
creating, via the private communication bridge processor, a real-time distribution channel that is sustained during a portion of the interest lifetime to host an exchange between the potential customer and the supplier via the real-time distribution channel based on the match, wherein the potential inventory item is made available to the potential customer via the real-time distribution channel;
analyzing the historical purchase information via an intelligent suggestion engine of the virtual purchasing assistant to form a customer purchase profile;
continuously searching, via the intelligent suggestion engine, during the interest lifetime for another item than the inventory item to suggest the potential customer acquire based on the customer purchase profile; and
provide a notice to the potential customer from the intelligent suggestion engine via the real-time distribution channel that at least one other item is available to the potential customer, where the notice provides visibility of inventory that is personalized, immediately actionable and not readily available to the public.

2. The method of claim 1, wherein the historical purchase information includes at least one of a timeframe of purchase and a geolocation of the potential customer.

3. The method of claim 1 further comprising:
providing a recommendation of the purchase based upon analyzing of the historical purchase information including a detailed user profile, prior expressions of interest, previous purchases and previous offer declines.

4. The method of claim 2 further comprising:
determining, via the geolocation, a proximate location of the potential customer and recommending a purchase offer based on the proximate location of the potential customer.

5. The method of claim 1, wherein the query includes an itinerary.

6. The method of claim 2, wherein the real-time distribution channel comprises a connection providing one or more candidates for the at least one match based on an ongoing search based on one or more intelligent factors comprising the customer profile, the geolocation, the at least one customer specification, and the at least one supplier specification.

7. A computer processing system to facilitate remote purchasing of an item via a computer network comprising:
at least one processor adapted to establish a private communication bridge via a server coupled to the computer network, the private communication bridge between a potential customer and a supplier which is not accessible to the public; and
at least one memory including code which when executed perform a method including:
providing a virtual purchasing assistant at the server to store a digital representation of a customer purchase profile including historical purchase information of the potential customer;
providing a supplier portal from the server to the supplier via the computer network, and receiving, at the supplier portal, data representing a supplier specification of a time sensitive inventory item;
providing a user portal from the server to the potential customer via the computer network, and receiving, at the user portal, data representing a customer specification from the potential customer of an expression of an interest in a purchase, the expression of the interest in the purchase comprising at least an interest lifetime where the expression of the interest expires after the interest lifetime;
creating a real-time distribution channel between the potential customer and the supplier, via the private communication bridge, to facilitate a secure transaction between the potential customer and the supplier in which both have real-time exchange information sent to them from the server to facilitate a matching of the time sensitive inventory item available from the supplier and the purchase, the real-time distribution channel performing a matching of the customer specification and the supplier specification, wherein the real-time distribution channel is sustained during the interest lifetime;
conducting an exchange, via the private communication bridge, wherein the inventory item is made available to the at least one potential customer based on the matching;
analyzing historical purchase information to form a customer purchase profile;
continuously searching, via an intelligent computer based artificial intelligence engine of the server, during the interest lifetime for another item other than the inventory item to suggest the potential customer acquire based on the customer purchase profile; and
providing a notice, via the private communication bridge, to the potential customer via the real-time distribution channel that the another item is available to the potential customer.

8. The computer processing system of claim 7, wherein the historical purchase information includes data representing a timeframe of purchase and a geolocation.

9. The computer processing system of claim 8, wherein the method further comprises:
determining, via the geolocation data, a proximate location of the potential customer and recommending, via the user portal, a purchase offer based on the proximate location of the potential customer.

10. The computer processing system of claim 7, wherein the customer specification further comprises an itinerary.

11. The computer processing system of claim 8, wherein the real-time distribution channel comprises a connection providing one or more candidates for the at least one match based on a an ongoing search based on one or more intelligent factors comprising the customer profile, the geolocation, the at least one customer specification, and the at least one supplier specification.

12. A computer-readable memory device including code which when executed by at least one processor provides operations comprising:
implementing a virtual purchasing assistant to store a digital representation of a user decision process when facing a purchase decision, including historical purchase information of the user;
establishing a private communication bridge between the user and a supplier;
receiving a customer specification from the user of an expression of an interest in a purchase, the expression of the interest in the purchase comprising at least an interest lifetime;
receiving a supplier specification from a supplier of an inventory item;
creating a real-time distribution channel, via the private communication bridge, to facilitate a secure transaction between the user and the supplier, the real-time distribution channel performing a matching of the customer specification and the supplier specification without direct interaction from the user, wherein the real-time distribution channel is sustained during the interest lifetime;
conducting an exchange wherein the inventory item is made available, via the real-time distribution channel, to the user based on the matching;
collecting historical purchase information from the user;
analyzing the historical purchase information to form the digital representation;
continuously searching, via an intelligent software based system, during the interest lifetime for another product other than the inventory item to suggest the user acquire based on the digital representation; and
providing a notice from the intelligent software based system to the user via the real-time distribution channel that the another product is available and immediately actionable to the user.

13. The computer-readable memory device of claim 12, wherein the historical purchase information include at least one of a time frame of purchase and a geolocation.

14. The computer-readable memory device of claim 12, wherein the private communication bridge offers visibility to the user of inventory that is filtered such that the inventory is personalized, immediately actionable, and not readily available to the public at large.

15. The computer-readable memory device of claim 12, wherein the operations further comprise constantly evaluating for another product and adjusting pricing on the user's behalf using a dynamic pricing algorithm.

16. The computer-readable memory device of claim 12, wherein the operations further comprise executing a continuously learning intelligent agent such that the digital representation can be updated based on the user's successes, failures, choices, actions, and inactions.

17. The computer-readable memory device of claim 13, wherein the operations further comprise determining, via the geolocation, a proximate location of the user and recommending a purchase offer based on the proximate location of the user.

18. The computer processing system of claim 7 comprising the method further including:
delivering an offer of the sensitive inventory item available from the supplier to multiple potential customers linked to a match of the supplier specification and respective customer specifications via the real-time distribution channel;
selecting a winning customer from the multiple potential customers; and
collecting non-winner data from the multiple potential customers that were not selected as the winning customer;
analyzing the collected non-winner data to determine a statistical characteristic; and
delivering the statistical characteristic to the supplier via the supplier portal.

19. The computer processing system of claim 18 comprising the method further including:
analyzing the customer specification against the collected non-winner data determine a non-winner data analysis;
suggesting a second real-time exchange based upon the non-winner data analysis;
collecting historical purchase data of the potential customer;
analyzing the customer specification against the collected historical purchase data to generate a historical purchase analysis; and
suggesting another item for purchase by the potential customer based on the historical purchase analysis.

20. The computer processing system of claim 7 comprising the method further including:
determining dynamic pricing driven by supply and demand;
suggesting new pricing based on the dynamic pricing to the supplier via the supplier portal;
receiving an indicator from the supplier portal of a supplier agreement to the new pricing; and
incorporating the new pricing in an offer sent to the user to purchase an upsell item.

* * * * *